US008453583B2

(12) United States Patent
Malavasi et al.

(10) Patent No.: US 8,453,583 B2
(45) Date of Patent: Jun. 4, 2013

(54) HIGH-EFFICIENCY COMBUSTORS WITH REDUCED ENVIRONMENTAL IMPACT AND PROCESSES FOR POWER GENERATION DERIVABLE THEREFROM

(75) Inventors: Massimo Malavasi, Milan (IT); Edoardo Rossetti, Bologna (IT)

(73) Assignee: ITEA S.p.A., Bologna (IT)

( * ) Notice: Subject to any disclaimer, the term of this patent is extended or adjusted under 35 U.S.C. 154(b) by 190 days.

(21) Appl. No.: 11/579,958

(22) PCT Filed: May 11, 2005

(86) PCT No.: PCT/IB2005/001290
§ 371 (c)(1),
(2), (4) Date: Nov. 9, 2006

(87) PCT Pub. No.: WO2005/108867
PCT Pub. Date: Nov. 17, 2005

(65) Prior Publication Data
US 2007/0240425 A1    Oct. 18, 2007

(30) Foreign Application Priority Data
May 11, 2004   (IT) .............................. BO2004A0296

(51) Int. Cl.
F23B 80/02 (2006.01)
F23C 9/00 (2006.01)
B09B 3/00 (2006.01)
F23L 7/00 (2006.01)
F23G 5/00 (2006.01)

(52) U.S. Cl.
USPC ........... 110/297; 110/205; 110/235; 110/306; 110/259; 110/216

(58) Field of Classification Search
USPC .... 110/204, 306, 302, 301, 348, 297; 431/11; 210/758, 761, 762
See application file for complete search history.

(56) References Cited

U.S. PATENT DOCUMENTS

| 3,309,866 A | * | 3/1967 | Kydd ............................. 110/264 |
| 4,925,389 A | | 5/1990 | DeCicco et al. |
| 5,154,599 A | | 10/1992 | Wunning et al. |
| 6,453,830 B1 | * | 9/2002 | Zauderer ....................... 110/345 |
| 6,764,304 B2 | * | 7/2004 | Atreya .......................... 110/295 |
| 7,074,033 B2 | * | 7/2006 | Neary ............................. 431/11 |
| 7,077,069 B2 | * | 7/2006 | Oomura et al. ............... 110/348 |
| 7,108,730 B2 | * | 9/2006 | Shah et al. .................... 431/162 |
| 2006/0105278 A1 | * | 5/2006 | Katayama ....................... 431/11 |

FOREIGN PATENT DOCUMENTS

| EP | 1 217 299 A | | 6/2002 |
| WO | WO 9301449 A1 | * | 1/1993 |
| WO | 03/036064 A | | 5/2003 |
| WO | 03/038339 A | | 5/2003 |

* cited by examiner

Primary Examiner — Kenneth Rinehart
Assistant Examiner — David J. Laux
(74) Attorney, Agent, or Firm — Arent Fox LLP

(57) ABSTRACT

A process for combusting solid liquid or gaseous fuels in a high temperature refractory-lined reactor with the aim of generating electric power comprises mixing at least one fuel with steam. The refactory material of the reactor and the opaque gases of the reaction environment bring about high power infrared radiation which substantially instantaneously preheats the reactants on input including said reactants being intrinsically transparent to infrared radiation ($N_2/O_2$) but rendered opaque and thus absorbers of energy from infrared radiation thanks to dilution with steam. A high efficiency combustor is provided for carrying out the above-stated process.

15 Claims, 4 Drawing Sheets

Figure 1:
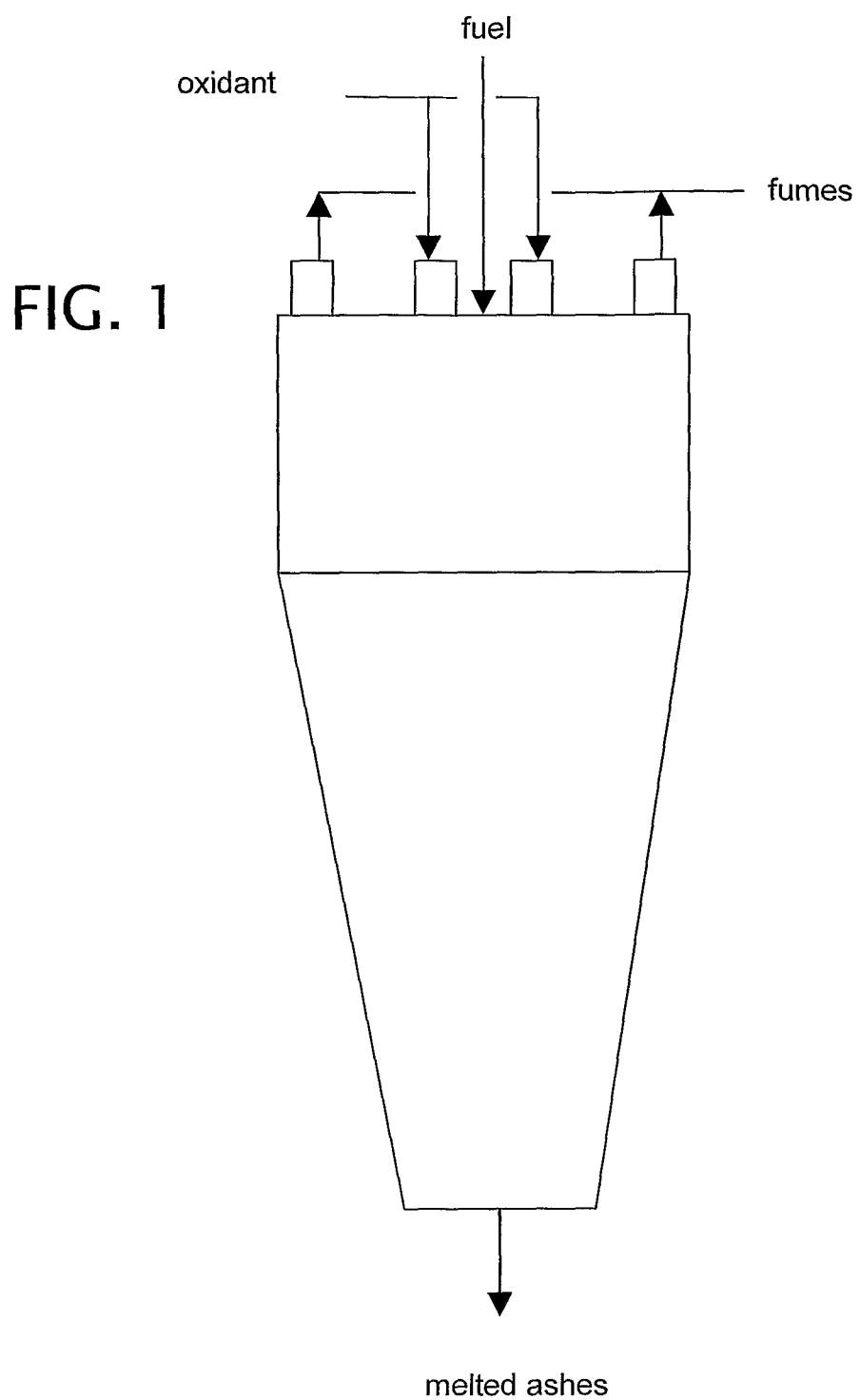

HIGH-EFFICIENCY COMBUSTORS WITH REDUCED ENVIRONMENTAL IMPACT AND PROCESSES FOR POWER GENERATION DERIVABLE THEREFROM

CROSS-REFERENCE TO RELATED APPLICATION

This application is a National Stage entry of International Application No. PCT/IB2005/001290, filed May 11, 2005, the entire specification claims and drawings of which are incorporated herewith by reference.

BACKGROUND OF THE INVENTION

Research and applications technology relating to the combustion of fossil fuel with an oxygen oxidant (from air to cryogenic grade), namely to flames, are of great relevance for the quantitative impact on the environment, and for the power generation economic impact on the development.

With the specific aim of reducing environmental impact, there has been a progressive shrinkage of the flame operating temperature range, though temperature being the most significant variable with regard to productivity. Threshold temperature limits has been put to limit toxic organic compounds (dioxins, furans, polyaromatic hydrocarbons (PAH)), as well as ceiling T values have been set to limit green-house gas ($NO_x$), while substantial efforts have been made to achieve punctually more controlled combustion conditions (CO, $NO_x$).

Accordingly, the primary thrust in the development of flame technology has constantly been directed towards the development of fluid dynamic conditions capable of promoting intimate and rapid mixing of fuels with the oxidant. More specifically, reference should now be made to jet flames, in which the energy of the jet is modified with the most various geometries and measures to promote mixing, to promote internal mixing with combusted gases, and forming a positionally stable flame of the desired size.

The physical place of the flames commonly coincides with the reaction zone in which solid particles are present, or are generated, such particles being the only ones capable of emitting radiation into the visible range, within the temperature range 1000-2500 K. Even flames of gaseous fuels, e.g. methane, emit in the visible range due to the formation of solid carbonaceous nanoparticles (soot, widely proven).

Furthermore, for what concerns emissions impacting the environment, flames are associated with the formation of $NO_x$, which rises exponentially with temperature, and of CO due to incomplete combustion.

The flame is an intrinsically highly complex phenomenon which can be described quantitatively at the macro scale and punctually only at the final front where the reactions in play have already run to completion. At the micro scale, which is decisive to the effects of chemical behaviour, the phenomenon is essentially chaotic. Any description which may be made is based solely on methods of a statistical nature. Adjacent to ultra-high temperature elementary domains, in which the reactions are already complete, there are cold domains in which the reactions have not yet begun.

The heat of reaction is high, but has high threshold values (autoignition above 1100 K), and steep concentration and temperature gradients are established. The three parameters stated above are of the "catastrophic" type, to use the terminology for the analysis of systems with nonlinear parameters, and combine with one another, inevitably giving rise to a "chaotic" system, which, as stated, can only be described using statistical methods.

The punctual indeterminacy of flames (physical indeterminacy, only statistical description) is also found in prior art post-combustors, i.e. in flames produced with secondary injection of fuel, or of fuel and oxidant, into the outlet gases from a primary combustion process. In fact, only a partial reduction in $NO_x$, CO and TOC (Total Organic Content) is achieved. In this instance, it should perhaps be added that the flames are chaotic phenomena with a time characteristic of the order of a fraction of a second.

Document U.S. Pat. No. 5,154,599 describes a relevant novel development in which it is shown how, by significantly reducing these gradients (substantial dilution of the oxidant and the fuel with combusted gases, preheating of the oxidant feed to temperatures above the autoignition threshold of the fuel), it has been possible to enter a new operating zone in which combustion could take place without giving rise to a visible flame (flameless, volume combustion), namely without emitting radiation in the visible range.

Among the most striking effects on emissions which may be mentioned are the great reduction in $NO_x$, in CO and the absence of soot.

However, the invention, and also subsequently detailed fundamental studies arising from the invention, have shown that the flameless condition occurs in the combustion of gaseous fuels, and within ranges of existence defined by dilutions of no less than a ratio of approx. 3 (or a maximum oxygen concentration of approx. 3.5% in the diluted oxidant) and with preheating to no less than the autoignition temperature.

The elevated capital and variable costs, both due to perform, inside or outside the combustors, the necessary dilution and heating of the reactants, they have greatly restricted industrial applications of the invention mentioned above.

This is exemplified also by other prior art (and specifically patents U.S. Pat. Nos. 5,961,312, 5,441,403, 4,945,841, 5,813,846, 4,945,841, 5,772,421, 5,863,192, 5,899,680, 5,931,653). These relate to arrangements for mixing a primary or secondary fuel, but which is in each case specified generically, with air and, in some cases, intake of combustion gases into the diffusion zone of the flame directed at ensuring low levels of $NO_x$ formation.

There is no patent which is directed at the formation of homogeneous temperature zones, nor at the use of oxygen in any concentration, nor, above all, at the exploitation of the radiant capacity of the combusted gases to achieve surface combustion of liquid and solid fuels, nor even less at using these effects in pressurised combustors.

Some patents provide the envisaged arrangement with more or less defined geometries, but only for the purpose of mixing the components and not of exposing the cold gases to radiance.

Further evidence of the punctual indetermination of flames may be found from the analysis of combustors with high/ultra-high temperature flames capable of melting the incombustible ashes (slagging combustors which have been known since decades). In fact, the teaching makes it possible to melt a tangible proportion of the incombustible material. However, unfused incombustible particulates (fly ash) are nevertheless still present and cannot be eliminated even by the higher temperature flames. The prior art is in fact faced with a ceiling value of 90%, namely 10% of residual ashes (c.f. for example documents U.S. Pat. Nos. 4,685,404, 4,961,389, 4,920,898and 4,909,030).

The combustion process illustrated in document PCT/IB2004/001220 from the present applicant teaches that a combustion reactor with oxygen, suitably rendered "quasi" isothermal thanks to the presence of opaque gases ($CO_2$ and $H_2O$, principally $H_2O$, strong IR absorbers/emitters) in the combustion flue gases, and in the oxidant feed due to recycling of said flue gases, is capable of ensuring complete combustion of the introduced fuel materials, so ensuring a particularly low quantity of total organic contents, and thus of toxic organic substances, in the flue gases, together with complete transformation of the fly ash into molten ashes.

There was accordingly a requirement to provide a combustor which, apart from providing:
a substantial reduction (transformation rather than formation) of toxic organic compounds in the flue gases,
quantitative transformation of incombustible ash into molten ashes, separated in the combustor itself, should be capable of producing flue gases with a low content of:
$NO_X$
CO
right at the reactor outlet and prior to intervention by fume post-treatment operations, and with all types of fuel, in particular problematic fuels.

It has surprisingly been found that an isothermal reactor, as mentioned above in the claim of the present applicant, obtained by means of:
a refractory-lined reactor,
the use of technical grade oxygen or air enriched with oxygen content above 50%, and preferably 90% oxygen produced by vacuum swing absorption (VSA) technology,
introduction (recycling) of gases opaque to infrared radiation (IR), namely $CO_2$ and $H_2O$, and principally $H_2O$, premixed with the oxidant,
operated under pressure, in order to increase the density of the opaque gases, and at elevated temperatures to excite elevated IR radiation flux from the opaque gases to the fuels if the fuels are fed to the reactor as follows:
the volatile liquid fuels are fed mixed even roughly with water and/or steam,
the nonvolatile liquid fuels (high molecular weight organic compounds, i.e. molten organic solids) are fed mixed even roughly with water and/or steam,
the solid fuels are ground to dimensions of a few millimetres, and suspended in water (water slurry), and fed as a slurry,
combustion flue gases are obtained which also have a very low content of $NO_X$ and of CO. In other words, it is capable of performing flameless combustion (mild, volume combustion) even of non-vaporisable liquid fuels and of solids.

The above-stated characteristics of the combustor then make it possible to design and implement thermodynamic power generation cycles which are simple, highly efficient and have low environmental impact, and, above all, which can process problematic fuels (low ranking fuels).

One possible and reasonable explanation, although this does not limit the scope of the invention, attributes this to the unique combination:
very strong radiance from the high temperature refractory walls of the reactor
very strong radiance from the high temperature combustion gases, primarily containing strong IR emitters such as $H_2O$ and $CO_2$ (opaque gases), and under pressure
the content of $H_2O$ and $CO_2$ in the feeds, both (and primarily the former) strong IR absorbers
operation under pressure which increases the density of the opaque gases
feed to the reactor of the oxidant pre-diluted with $H_2O$ and $CO_2$
operation under pressure which increases the density of the opaque gases a combination which makes it possible to raise instantaneously the temperature of fuels and oxidant fed at ambient temperature to temperatures of above 1300 K in the reactor, and to give rise to the combustion reactions under conditions such as to eliminate the steep temperature and concentration gradients, and to equalise the rates of reaction at all points on the reaction front. It is accordingly assumed, without this limiting the invention, that once these steep gradients have been eliminated, these three parameters are no longer "catastrophic" and cease to give rise to the "chaotic" flame system known in the art which can only be statistically described.

The reaction system thus becomes readily controllable both in terms of punctual and average conditions within values which provide access to a novel operating zone where it is possible to achieve more favourable compromises from the standpoint of efficiency and emission reduction for the generation of energy from low ranking fuels.

Moreover, and still without limiting the scope of the invention, it is thought that in the case of solid and liquid fuels, even those having an organic nitrogen content of some percent, the very strong IR radiation (of the order of a $MW/m^2$) incident on the surfaces of the fuel particle brings about an essentially superficial reaction which is dominated and controlled by diffusion of the oxidant, C to CO for example, so giving room at elevated temperature to a reaction which completely destroys the $NO_X$ of organic origin by reaction with CO, and delaying until the bulk gas reactions the development of the predominant proportion of the reaction heat under the controlled (non-"chaotic") conditions described above.

Finally, and still without limiting the scope of the invention, the influence of the addition of steam or water into the injection "envelope" of the fuel into the combustor, which is not decisive taken alone, but nevertheless brings about an appreciable reduction in pollutant byproducts, constitutes further potential confirmation of the mechanisms just described above. When the fuels contain incombustible ash, the ash is concomitantly melt and turbulence ensures complete coalescence of the particles of liquid ash, as has been described in the prior art (PCT/IB2004/001220 of present applicant).

The combustor of the invention, which operates in flameless conditions without preheating of the feeds and without restrictions for maintaining flame stability, materialises the use of low ranking fuels to produce fumes which are at elevated temperature and are substantially free of hydrogenated organic compounds and particulates and yields substantially smaller quantities of gaseous pollutants. The availability of the combustor makes it possible to devise high efficiency thermodynamic cycles for the generation of electrical power which cannot otherwise be achieved at a similar level of simplicity.

One of the preferred embodiments of the present invention is a combustion process for gaseous fuels ($H_2$, $CH_4$, light hydrocarbons, S, syngas and other gaseous fuels with low caloric value) in a high temperature refractory-lined reactor, with the aim of generating power.

The reactor operates with fuel(s) and oxidant premixed with steam, and/or combustion flue gases, introduced into the two streams using various known methods. The two streams are fed separately, the fuel preferably being fed to the axis of the reactor, and the oxidant at a plurality of peripheral points around the fuel. Thanks to the refractory material and to the opaque gases of the reaction environment (both the recycled flue gases and the introduced steam), high power IR radiation instantaneously preheats the reactants on input, said reactants being intrinsically transparent to IR($N_2$, $O_2$) but rendered opaque and thus IR absorbers thanks to dilution with steam. A particularly uniform and controlled reaction front (flameless, mild combustion, volume combustion) develops until both the fuel and the oxidant are completely consumed. The reaction proceeds without there apparently being a lower limit for preheating of the fed reactants. However, it is preferable for the concentration of the opaque gases in the feeds not to fall below 30%.

It does not seem necessary to provide any particularly sophisticated fluid dynamics for the reactor, nor for feed of the reactants. With regard to the reactor, a simple cylindrical geometry is effective at least at a scale of thermal power of some tens of MW. At larger scales, it must be borne in mind that the contribution to the IR radiation made by the refractory rises in scale in accordance with surface area. It is thus necessary to increase the level of contribution made by the combustion flue gases to the instantaneous heating of the feeds. In this case, the geometry proposed in the attached schematic drawing (attached drawing), with the axial inlets and peripheral outlets on the same side, fully meets this requirement thanks to the contribution made by radiance from the hot flue gases.

The combustion reaction carried out according to the criteria of the process makes it possible to achieve negligible emissions of soot, TOC, CO, $NO_X$ even when operating with oxidant (oxygen, air) at a ratio 1.05 close to stoichiometric conditions, i.e. with excesses very much lower than the ratio 2 essential in the prior art.

Figure 2:
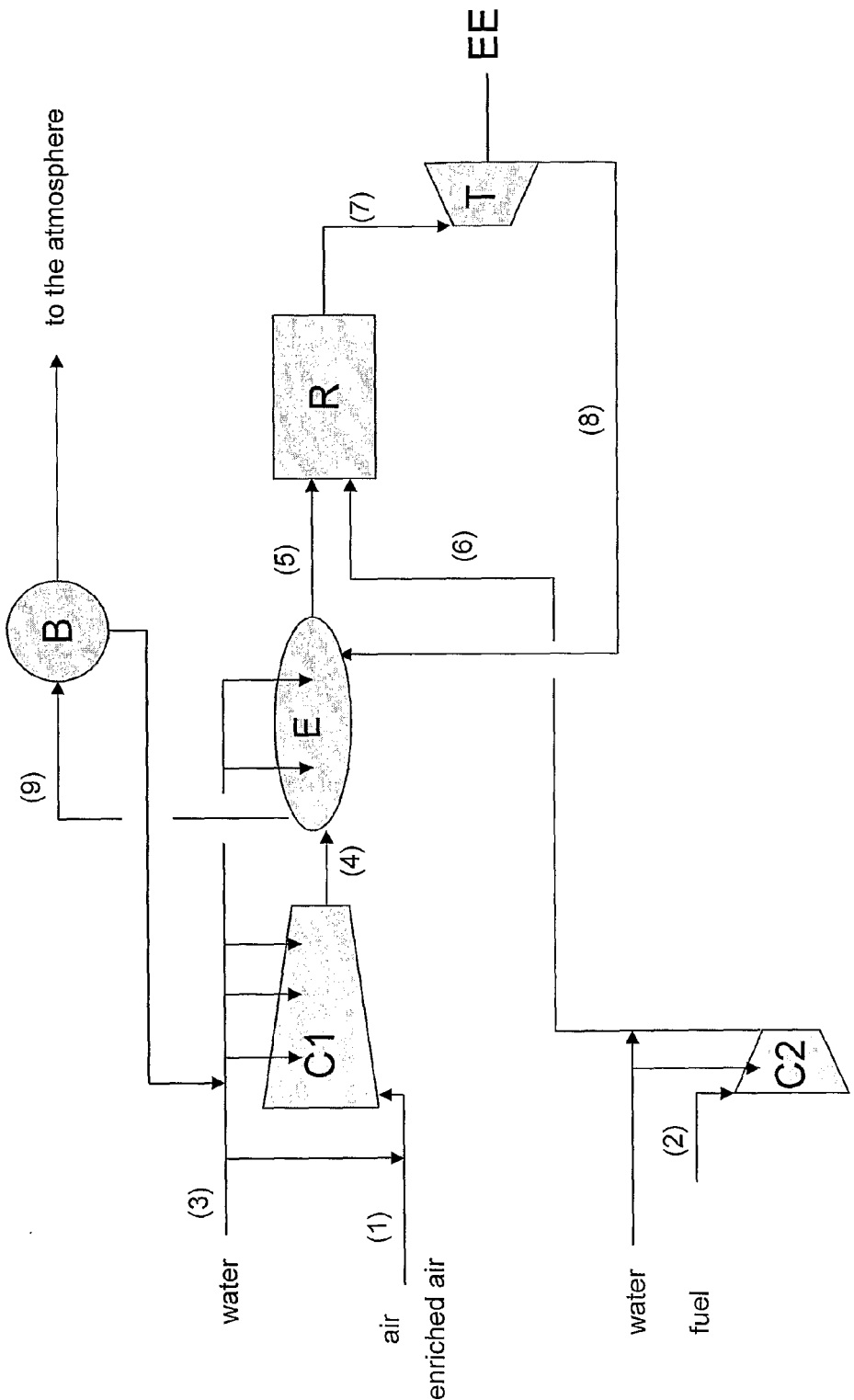

The overall process for energy generation consists (FIG. 2), for example, in drawing in air (1) and compressing it in the axial compressor (C1) to pressures of between 1600 and 2500 kPa abs. Compression may be adiabatic according to the prior art; isothermal compression is preferred, with direct injection of deionised water into each stage of the compressor, or by means of intermediate tapping of gas into which water is injected up to saturation and subsequent reintroduction into the compressor.

The compressed gas is sent (4) to the heat recovery unit (E). The recovery unit uses the exhaust gases (8) output from the turbine (T) at a temperature of approx. 800-900 K.

It is more preferred (FIG. 2) to use the heat recovery unit (E) as a saturator, according to the prior art, by introducing preheated water (3) at a plurality of points during the course of oxidant preheating. The gaseous fuel (2) is compressed in the compressor (C2) in accordance with the isotherm concept by means of injection of water.

The compressed oxidant and fuels, preheated to 600 K and preferably to 700 K, the difference between the two cases being accounted for by a greater and a lesser quantity of water vaporised and added (between 40 and 60% by weight relative to the sum of fuel plus oxidant, and until recovery of all the heat contained in the gases discharged by the turbine), are sent (5 and 6) to the combustor (R).

Complete combustion is performed in the reactor and the outlet gases reach a temperature of 1400 K and preferably higher temperatures of up to 1600 K, corresponding to the upper operating temperature limit for prior art turbines with cooled ceramic blades.

When low-grade fuels are used, for example solid fuel pyrogasifier gases with elevated contents of uncombusted organic compounds (TOC of the order of a few percent) and also micropowders, combustion is performed at temperatures of up to 2000 K in order to ensure complete destruction of the introduced organic substances and the melting and coalescence of the liquefied ash. Water is then added to the outlet gases from the reactor until the upper operating temperature limit (1600 K) of prior art turbines is reached.

The gases from the combustor are sent (7) to the turbine (T) for isoentropic expansion to atmospheric pressure and a temperature of around 700-800 K, variable as a function of steam content.

In the event that water consumption is a problem, the outlet flue gases from low-grade heat recovery (E) are sent (9) to the condensing steam recovery section (B). The condensing section may comprise finned tube heat exchangers or condensing columns with recirculation of cooling water in towers, or combinations of both types.

The process is only apparently more complicated and costly than prior art turbogas systems characterised by a very compact design of the base unit, axial compressor/annular chamber of combustors/expansion turbine. In the prior art, the base system achieves prior art (electrical/thermal) cycle yields of around 35-40% and that only at maximum power. Higher levels of efficiency are obtained with "combined" cycles, i.e. by adding a steam boiler to recover the heat output from the turbine and a steam expansion turbine.

In reality, by way of comparison, in the process of the invention:
  the recovery units/saturators (E) are of a very compact design and made from ordinary materials.
  the combustor (R) is only of more apparent volume, being much less complex and sophisticated than the annular chamber accommodating flames.

Furthermore, the system of the invention is exceptionally flexible with regard to acceptable fuels, including low-grade fuel gases and fuel gases obtained from systems for gasifying low-grade solid fuels, for example biomass and refuse. Further flexibility of the system of the invention is manifested in its management and efficiency when the required electrical load is varied.

It will be remembered that in a prior art turbogas system, 30% of the work obtained from the turbine is expended on compression of the oxidant in the axial compressor. Axial compressors are intrinsically inflexible and begin to stall at flow rates differing only slightly from the rated flow rates (tolerance of less than 10%), and are a fixed load factor in operation. At electrical loads below the maximum load, net efficiency drops rapidly in a more than proportional manner. Furthermore, the only way to control the power delivered is to throttle the fuel, which reduces the temperature of the combusted gases and so brings about a further reduction in specific thermodynamic efficiency. The acknowledged rapid start-up time of prior art turbogas systems is in part offset by a clear lack of flexibility in operation.

In comparison, the combustor of the invention:
  provides stable combustion over a wide load range (from 20% to 120%) with very low load losses (on the contrary, jet flames predominantly consume and are efficient over a much tighter range of operability)
  adjusts the delivered power by adjusting the addition of steam, at a constant fume temperature, so adjusting the flow rate and molecular weight at the turbine
  being appropriately refractory-lined, the combustor may be kept hot in stand-by status with a pilot flame, and with a fuel consumption of less than 1% of the rated load, ready to be started up to maximum power within a very short time.

The minimum thermodynamic efficiency of the (electrical/thermal) cycle in the above-stated configurations of the invention is 50% and rises to values of around 60% in the event of heat recovery by saturator and a reaction at 1600 K. This is thanks to the power required to compress the oxidant having been halved, to the fact that the addition of water only has an impact on the cycle in terms of pumping energy and to the recovery of low-grade heat from the spent flue gases down to 350 K.

This energy efficiency is accompanied by scarcely noticeable emissions at the combustor outlet, namely TOC of the order of ppm, CO always below 10 ppm, $NO_X$ of the order of a few tens of ppm and only at higher combustion temperatures.

At higher temperatures (those required by more problematic fuels), efficiency drops, but only a little and with the substantial advantage of using much less costly fuels.

In one preferred variant, 90% oxygen is used as oxidant, the oxygen being produced from air by means of a prior art enrichment process involving selective adsorption on zeolites. The enrichment section supplies 90% oxygen at atmospheric pressure with overall specific consumption of electrical energy of around 0.1 kWh/kg of $O_2$.

The oxygen may be used to enrich the combustion air (injected into the axial compressor at the position corresponding to 250 kPa) or to replace the air entirely.

Efficiency falls, but not significantly. Enriched air and oxygen are indicated for combusting fuels with a lower calorific value per unit volume. Furthermore, the great reduction in the volume and condensable component content of the exhausted flue gases makes it more readily possible to:
  bring about a substantial reduction in the size of the final condensing section (B), and to provide a net output of water from the cycle
  recover $CO_2$ in the form of sodium bicarbonate by means of an additional absorption column with a soda feed.

Another preferred embodiment of the process is a process for combusting liquid fuels (hydrocarbons, heavy refinery fractions, bitumens, spent solvents, orimulsion, liquid fuels having a variable content of solid breakdown products, water and sulfur) in a high temperature refractory-lined reactor, with the aim of generating energy.

The reactor operates with fuel(s) premixed with water, and with oxidant premixed with steam introduced into the streams using various known methods. The two streams are fed separately, the fuel preferably being fed to the axis of the reactor, and the oxidant at a plurality of peripheral points around the fuel.

The principle of operation is similar to that described above for the gaseous fuel combustor. A particularly uniform and controlled reaction front (flameless, mild combustion) develops until both the fuel and the oxidant are completely consumed.

The reaction proceeds without there being any apparent lower preheating limit. However, it is preferable for the concentration of the opaque gases in the feeds not to fall below 30%.

It does not seem necessary to provide any particularly sophisticated fluid dynamics for the reactor. Nor is it necessary to provide atomising nozzles for the fed liquid, a normal sparger without significant restrictions in cross-section being sufficient. In the case of bituminous fuels, it is sufficient to provide melting and heating until a viscosity of a few hundred Poise is obtained, and in-line mixing with steam. Non-liquid fractions, provided that they are dispersible in water, are entirely acceptable and have no influence on yields and emissions.

In the combustor of the invention operated at temperatures of greater than 1900 K, the ash melts, and in the molten state readily coalesces, and it is collected at the bottom of the combustor, in accordance with the recent teaching of PCT/IB2004/001220 of the same applicant.

The problems of scaling up the reactor are similar to those already examined for the gas combustor and may be solved with the design shown in the attachment.

The reactor is characterised by TOC, Co, $NO_X$ and carbonaceous particle emissions which are barely noticeable and considerably below the prior art, though operated with a fuel/oxidant ratio approaching 1.

The overall process for the generation of power may be that already introduced for gaseous fuels, with the exception of inevitable adjustments required by good engineering practice to take account of the different nature of the fuel (liquid).

Figure 3:
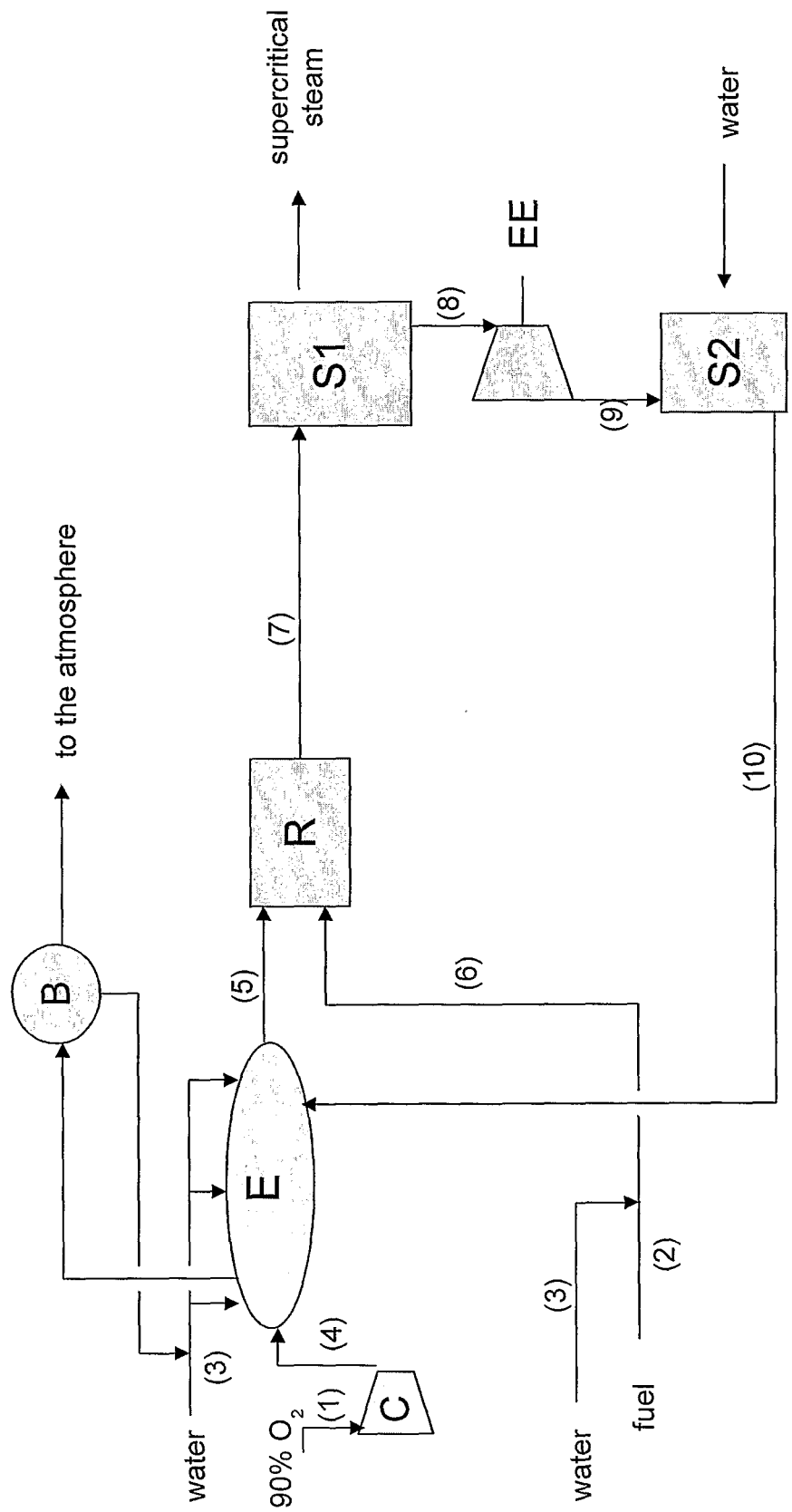
Figure 4:
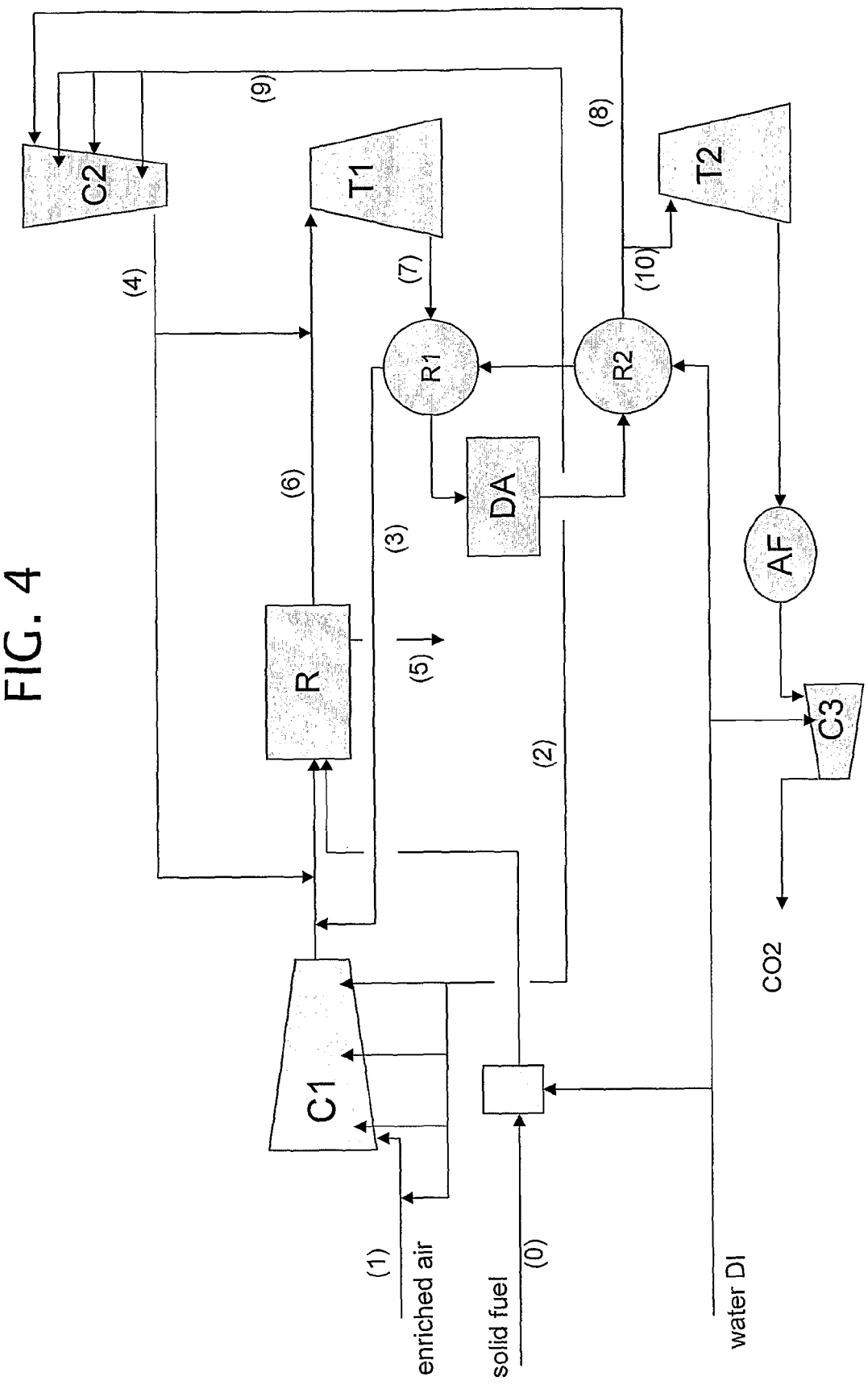

However, also for the purposes of retrofitting (partial modification) of existing energy generation plant, the overall process may be of the structure shown in the diagram below (FIG. 3).

For example, the air oxidant (1) is compressed in the compressor (C) up to the pressure of 350 kPag. The compressed oxidant is sent (4) to the heat recovery unit (E) which on the air side effects progressive saturation with steam, utilizing the low-grade heat output (10) by the steam recovery and production boiler (S2), and preheating to 400-500 K. The level of preheating and the content of added steam are, however, such as to ensure complete utilisation of the low-grade heat to temperatures of 350 K.

The liquid fuel (2), optionally preheated to ensure the necessary fluidity, is mixed with water (3), and preheated with low-grade heat.

Oxidant and fuel (5 and 6) are sent to the combustor (R), for complete combustion, at fume temperatures of 1600 K, preferably 1900 K if the fuel contains ash to be coalesced in the reactor in the molten state.

The hot gases, without particulates, are sent (7) to the radiant zone of the supercritical steam production boiler (S1). The outlet gases, at a temperature of 1100 K and a pressure of 350 kPa absolute, are sent (8) to the turbine (T) for expansion to atmospheric pressure. They are then sent (9) to the downstream heat recovery sections (S2) for the production of steam, most often existing plant, up to a temperature of 600-700 K.

The steam produced by the boiler is sent to the expansion turbine for energy generation, according to known methods.

In comparison with the prior art, the process of the invention permits:
  emissions of TOC, particulates, CO, $NO_X$ which are reduced to a particularly low, virtually insignificant, level
  substantially reduced corrosion and erosion in boilers due to the absence of particulates and uncombusted organic compounds, so permitting higher temperatures while using identical materials
  design of the radiant part of the boiler of small dimensions
  efficiency of the electrical/thermal power generation cycle of greater than 50%.

One possible variant of the cycle comprises the addition of a section for the production of 90% oxygen by means of the prior art process involving selective adsorption on zeolites. The section provides oxygen at atmospheric pressure, and may partially or completely replace compressed air.

Overall efficiency falls, but not significantly. Oxygen is preferable in particular when fuels with a high sulfur content are used, because it enables efficient and compact chemical post-treatment of the fumes for desulfurisation prior to discharge into the atmosphere. Using oxygen also makes it feasible to complete the water cycle with a positive balance by using a final condensation section which is small in size and low in cost.

Another preferred embodiment of the process is a combustion process for solid fuels (pit coal, high-sulfur coal, lignite, animal flours, refuse in granular form) in a high temperature refractory-lined reactor, with the aim of generating power.

The reactor operates with fuel ground to less than a mm in size and carried with water. The oxidant is premixed with steam introduced into the stream using various known methods. The two streams are fed separately, the fuel preferably being fed to the axis of the reactor, and the oxidant at a plurality of peripheral points around the fuel.

The principle of operation is similar to that described above for the gaseous fuel combustor and the liquid fuel combustor. Emissions can be observed in the visible range, as with traditional flames, but the range of emissions, with particular reference to CO and $NO_X$, is more then an order of magnitude lower than that known in the prior art for the combustion of coal. A particularly uniform and controlled reaction front (mild combustion) develops until both the fuel and the oxidant are completely consumed.

The reaction proceeds without there being any apparent lower preheating limit. However, it is preferable for the concentration of the opaque gases in the feeds not to fall below 30% by weight.

It does not seem necessary to provide any particularly sophisticated fluid dynamics for the reactor. Ultrafine grinding to 70-80 microns is likewise unnecessary.

In the combustor of the invention operated at temperatures of above 1900-2000 K, the ash melts, in some cases with the assistance of a moderate addition of flux (sodium and potassium carbonate, $SiO_2$), and, when fused, readily coalesces and is collected at the bottom of the combustor, in accordance with the recent teaching of PTO Itea.

The problems of scaling up the reactor are similar to those already examined for the gas and liquid combustor and may be solved with the design shown in the attachment.

The reactor is characterised by TOC, CO, $NO_X$ and carbonaceous particle emissions which are barely noticeable and considerably below the prior art, though operated with a fuel/oxidant ratio approaching 1.

The overall process for the generation of energy may be that already stated for gaseous fuels, with the exception of inevitable adjustments required by good engineering practice to take account of the different nature of the fuel (solid). It may also be that already stated for liquid fuels, always taking account of adjustments dictated by good engineering practice.

The above-stated variants also apply to solid fuels.

In comparison with the prior art, the process of the invention makes it possible:

also to utilise highly efficient, high temperature (>900 K) supercritical steam boilers with low quality coal (ash content, sulfur); something which has been completely impossible in the prior art due to the "slagging" problems caused by fused ash on the tubes, which is highly corrosive at elevated temperature to operate, using identical materials, supercritical plant at still higher temperatures due to the total absence of hydrogenated organic compounds.

Overall electrical energy/thermal energy efficiency is greater than 50%.

A further still more preferred embodiment of the process of the present invention, which may be derived in accordance with good engineering practice in order to make full use of the features of the combustor of the invention, is represented by the process for combusting low-grade, gaseous, liquid and solid fuels of the previous embodiments, and preferably solid fuels, with 90% oxygen as oxidant, in the combustor of the invention inserted in a thermodynamic cycle directed towards maximising yields (diagram attachment 3).

The combustor operates at a pressure of 1600-2500 kPa. The solid fuel (0) is fed to the reactor in the form of a slurry in water. The 90% oxygen (obtained by VSA) (1) is saturated with water and compressed in an axial compressor (C1) equipped with multiple injection points for preheated water (2) from the final fume heat recovery unit (R2).

The compressed oxidant is sent to the combustor, mixed with steam (3) obtained from the recovery unit R2 operating on the outlet gases from turbine (T1), and with combusted gases (4) compressed by means of the compressor (C2) coupled to the expansion turbine T1.

The combustor operates at temperatures of above 1700 K. Incombustible fractions are reduced to vitrified slag (5). The outlet flue gases from the combustor (6) are mixed with gases compressed by the compressor C2, so dropping in temperature to 1150-1200 K, and sent to the expansion turbine T1. The expanded gases at atmospheric pressure (7) pass through the recovery units R1, undergo dry deacidification in tower DA, and continue onward in the recovery section in recovery unit R2. The cold gases, at 370 K and close to the dew point, are in part returned (8) to the intake of compressor C2 and compressed to 1600-2500 kPa, using a similar method to that of compressor C1, i.e. with injection of preheated water (9) in R2 which maintains the temperature throughout compression and at the outlet close to the saturation T (470-490 K at the outlet).

The remaining fraction (10) of cold gases, equal to the net production plus vaporised water, passes into the expansion turbine T2, so expanding to the pressure of 20 kPa absolute maintained through the condenser AF at the condensation T of 313 K. Non-condensable components (essentially $CO_2$) and the steam at dew concentration are extracted with compressor C3. Compressor C3 recompresses the mixture to atmospheric pressure, using the water injection method, but this time with water which has not been preheated.

Thermodynamic efficiency of the cycle is greater than 60%. The proposed process is a more advanced and distinctly higher performance alternative even in comparison with complex and sophisticated prior art IGCC (Integrated Gasification Combined Cycles).

The following Examples are provided by way of non-limiting illustrations of the invention.

EXAMPLE 1

Reactor Preparation

An externally cooled metal structure, a reactor lined with refractory material and with an internal volume of 5.3 $m^3$ is taken into consideration. The reactor is fed with light fuel (or methane) and air with the aim of gradually raising (100 K/hour) the surface of the reactor to a temperature of above 1200 K.

On completion of the pre-heating phase, the reactor is fed with recycled flue gases, cooled to 550 K, and oxygen (oxygen content 87-93%, originating from the VSA unit) premixed with flue gases before entering the reactor, and it is pressurised. The surface temperature of the walls is monitored by pyrometers.

Quartz portholes, at both ends, provide an internal view. ODC (Optical Diagnostics of Combustion) technology is also applied by means of a 300-1100 nm photo-diode sensor for monitoring chemiluminescence phenomena.

The temperature of the outlet gases from the reactor is monitored, both by a laser diode sensor, which detects $H_2O$ absorption/emission, and by a high-temperature Zr thermocouple.

The flue gases from the reactor are detected by a set of fast response analysis units (T95: 1.5 seconds), specifically developed by Fisher-Rosemount, capable of monitoring both the bulk compounds, $H_2O$, $CO_2$, and the "micro" compounds, CO, NO, $NO_2$, $SO_2$ and TOC (Total Organic Content, hydrogen $CO_2$ flame detector). The analytical units analyse the gases at a frequency of 10 hertz. The original signal is recorded, skipping the data smoothing software. The closed cycle flue gases of the reactor are monitored in parallel, as soon as they are laminated to atmospheric pressure, by a group of FTIR sensors which detect $H_2O$, $CO_2$, $SO_2$, CO, $N_2O$, NO, $NO_2$, HCl with a response time of 40 seconds.

EXAMPLE 2

The preheated reactor of Example 1 is fed with light fuel and maintained at a pressure slightly above atmospheric. Over an 8 hour cycle, the fuel feed rate is gradually increased, from 1.5 litres/minute to 4 litres/minute, in order to increase the temperature of the flue gases from 1500 K to 2100 K with a gradient of 60-80 K/hour. Oxygen is fed to the reactor at a constant ratio to fuel, in such a manner as to maintain the excess of oxygen in the flue gases between 4 and 1.8 mol %. Recycled fumes are adjusted to allow an increase in the temperature of the flue gases.

The following changes in emissions were observed (obviously notwithstanding the scattering of the data):

|    | T flue gases | NO ppm | CO ppm | TOC ppm |
|----|--------------|--------|--------|---------|
| at | 1500 K       | 250    | 40     | 5       |
|    | 1900         | 150    | 15     | 1       |
|    | 2100         | 280    | 5      | 1       |

A wide visible flame zone, close to the feed zone, was observed through the quartz porthole. The flame zone shrinks progressively and disappears at above 2000 K.

EXAMPLE 3

(as Example 2, but at a Pressure of 400 kPa Absolute)
The following changes were observed:

|    | T flue gases | NO ppm | CO ppm | TOC ppm |
|----|--------------|--------|--------|---------|
| at | 1500 K       | 50     | 15     | 2       |
|    | 1900         | 30     | 5      | 1       |
|    | 2100         | 90     | 5      | 1       |

The flame zone is small from the beginning and disappears at 1700 K.

EXAMPLE 4

(as Example 1, but at a Pressure of 700 kPa Absolute)
The following changes were observed:

|    | T flue gases | NO ppm | CO ppm | TOC ppm |
|----|--------------|--------|--------|---------|
| at | 1500 K       | 15     | 5      | 1       |
|    | 1900         | 30     | 5      | 1       |
|    | 2100         | 90     | 5      | 1       |

The flame zone is very limited at the beginning and rapidly disappears.

EXAMPLE 5

Comparative Example

The above-described reactor is fed with air and light oil (23 $Nm^3$ per kg of fuel) at atmospheric pressure. The oil feed rate is gradually increased from 1.6 to 4 litres/minute, while the air feed rate is reduced and oxygen is added to the air so as to produce a temperature gradient equivalent to that provided in Examples 2, 3, 4.

A wide flame zone is always present, from the feed zone inverted cone) approx. to the centre of the reactor.

NO ranges from 250 ppm up to more than 1000 ppm (although the absolute reading may be questionable since it is four times the scale of the analytical sensor). TOC starts from above 50 ppm and never falls below 20 ppm. CO is always within the 30-70 ppm range.

EXAMPLE 6

The reactor of Example 1 is fed with heavy oil, HHV 41500 kJ/kg, comprising 17% by weight asphaltene, 8% carbonaceous material, with 90% content oxygen and recycled flue gases cooled to 550 K. The operating pressure is maintained at 400 kPa absolute.

The heavy oil is preheated to 450 K in the feed lines, and injected into the reactor through a steam actuated sprayer. The fuel feed rate is held constant at 5 litres/minute, while the feed rate of the recycled flue gases is controlled in such a manner as to reproduce the temperature gradient of Examples 2 to 4.

The following emission trends were observed:

|    | T flue gases | NO ppm | CO ppm | TOC ppm |
|----|--------------|--------|--------|---------|
| at | 1500 K       | 140    | 50     | 5       |
|    | 1900         | 100    | 30     | 2       |
|    | 2100         | 160    | 10     | 1       |

A small flame zone located close to the feed port was observed through the quartz porthole. The flame zone shrinks progressively and becomes extremely small in volume above 2000 K. ODC reveals that there is a qualitative change corresponding to these observations.

EXAMPLE 7

(as Example 6, but a Heavy Fuel Feed Rate of 10 Litres/Minute).
The temperature of the cool flue gases is 580 K.
The following emission trends were observed:

|    | T flue gases | NO ppm | CO ppm | TOC ppm |
|----|--------------|--------|--------|---------|
| at | 1500 K       | 150    | 60     | 8       |
|    | 1900         | 110    | 40     | 2       |
|    | 2100         | 160    | 10     | 1       |

EXAMPLE 8

(as Example 6, but at a Pressure of 700 kPa Absolute)
The following trends were observed:

|    | T flue gases | NO ppm | CO ppm | TOC ppm |
|----|--------------|--------|--------|---------|
| at | 1500 K       | 80     | 30     | 3       |
|    | 1900         | 100    | 30     | 1       |
|    | 2100         | 170    | 10     | 1       |

The visible flame zone with a small (inverted cone) close to the inlet is very limited and suddenly becomes negligibly small although it never disappears.

EXAMPLE 9

The same sequence as in Example 6 was performed, but the oxygen feed rate is increased so as to obtain an excess of 13-17 mol % of oxygen in the flue gases.

The following changes were observed:

|    | T flue gases | NO ppm | CO ppm | TOC ppm |
|----|--------------|--------|--------|---------|
| at | 1500 K       | 210    | 40     | 4       |
|    | 1900         | 150    | 25     | 1       |
|    | 2100         | 230    | 5      | 1       |

A white zone of visible flame which is much wider (relative to Example 6) located close to the feed port was observed through the quartz porthole. The flame zone shrank progressively, but remained wider than that in Example 6. ODC reveals a qualitative change corresponding to these observations and to the change in wavelength.

EXAMPLE 10

A sequence comparable with that of Example 6 was performed with oxygen directly fed into the reactor, in a position which is assumed to initiate internal mixing with the flue gases, but remote from the axial feed port.

Orimulsion (70% aqueous emulsion) is fed at 6 litres/minute through a steam actuated sprayer with an 8 mm orifice.

The following emission trends were observed:

|    | T flue gases | NO ppm | CO ppm | TOC ppm |
|----|--------------|--------|--------|---------|
| at | 1500 K       | 80     | 40     | 7       |
|    | 1900         | 60     | 20     | 3       |
|    | 2100         | 110    | 10     | 1       |

EXAMPLE 11

South African coal, caloric value 28500 kJ/kg, 17% by weight ash and 9% moisture content, is screened in such a manner as to obtain an average particle diameter of 2 mm (maximum particle size 4 mm).

Olive husk, originally coarsely ground into particles of an approximate diameter of 1-2 mm, caloric value 18400 kJ/kg, 8% by weight incombustible ash and 11% moisture, 0.7 organic nitrogen, is suspended in water (ratio: 1 kg of olive skin per 0.8 kg of water) in a stirred tank to obtain a pasty but still pliable liquid mix.

Screened coal is then added (1:1 by weight relative to the olive husk) together with 0.3 kg of water. The complete composition comprised 1 part olive husk, 1 part screened coal, 1.2 parts water. The density of the liquid mix is measured (1.12 kg/litre).

The liquid mix is pumped to the reactor of Example 1 and injected with a steam propelled sprayer through a 12 mm orifice. 90% title oxygen is premixed with recycled cold flue gases and is fed to the reactor in a proportion such as to maintain a level of 4 to 8% oxygen in the resultant flue gases. The reactor loop is at an absolute pressure of 400 kPa.

The feed rate of the liquid mix is held constant, by means of the volumetric pump, at around 1 m³/h (more precisely, 8 hours' operation totalized 9.65 m³ of slurry), while the recycled cool flue gases are controlled in such a manner as to reproduce the gradient of the fume temperature slope of Examples 2-4 and 6-11, over the range 1900-2100, before then holding the fume temperature level at 2100. In fact, higher T values are required in order to melt incombustibles (e.g. alkaline earth and metal oxides).

The emissions trends, despite exhibiting a much broader scattering (+/−15 ppm) are listed below.

|    | T flue gases | NO ppm | CO ppm | TOC ppm |
|----|--------------|--------|--------|---------|
| at | 1900 K       | 130    | 40     | 9       |
|    | 2100         | 100    | 60     | 3       |

It goes without saying that the above-stated concentration in the reactor flue gases must be divided by a factor of 7-8 per thermal MW generated, in respect to traditional technologies, in order to obtain quantitatively comparable figures.

A very small, slightly visible red flame zone, remote from the feed port is visible through the quartz porthole. The flame zone shrinks progressively, and declines to a very restricted volume at above 2000 K, while the entire reactor changes to a bright red colour. Axially directed thin luminous filaments are visible through the lateral ports along the reactor case.

Fused slag is drained from the lower part of the reactor, is cooled and carried away by a pressurised water loop. The characteristics of the vitrified slag are stated in the following list:

| Crystallinity: 0 (100% X-ray amorphous) | |
|---|---|
| C | <0.1 |
| Silica | 40% |
| Al | 17 |
| Ca | 17 |
| Fe | 10 |
| K | 7 |
| Mg | 3 |
| Na | 2 |
| Mn | 0.11 |
| Cr | 495 ppm |
| Ba | 467 |
| Sr | 418 |
| Cu | 176 |
| Zn | 132 |
| Ni | 83 |
| Pb | 40 |
| Sn | 5 |

Iso-kinetic sampling of the fly ash is set up at the reactor outlet. The solids are trapped on a 0.7 micron PTFE membrane filter. The sampling line and filter box are electrically heated and thermally insulated in order to avoid condensation.

One 8 hour sample and some shorter duration samples were taken.

| 8 hour average | 18 mg/Nm³ |
|---|---|
| low temperature phase of ½ hour | 31 mg/N m³ (3 samples) |
| ½ hour at elevated temperature | <5 (4 samples, all close to the lower limit of the technique) |

EXAMPLE 12

Comparison Example, with Reference to Example 11

The reactor of Example 1 is preheated to a wall temperature, in the vicinity of the outlet port, of 1600 K, and fed with air and pulverized (mean 20 microns) coal at 800 kg/hour. A venturi diffuser is fitted to the air feed tube just before the feed port. The pulverised coal is fed through a slot located in the narrow section of the venturi, and suspended in air in an air/coal ratio of 14.0 $Nm^3/kg$.

Cryogenic oxygen is added to the air to maintain the desired gradient of the temperature curve, namely 4-8% excess oxygen in the flue gases.

The run is interrupted after 4-6 hours due to the apparent degradation of boiler performance in relation to the flue gases, given an increase in cooled fumes temperature from 530 to 590 K, by the way a temperature which is close to the operating temperature limit of some devices installed on the cold fume side. Later on, the inspection of the fumes-in-the-pipe boiler reveals considerable fouling of the pipes caused by the ash, and ash build-up in dead spots.

The analytical value always exceeds 1500 ppm (more precise figures are meaningless, being more than six times greater than the analyser scale).

380 kg of vitrified slag are recovered from the reactor, amounting to only 80% of the incombustible fractions fed to the reactor (the difference exceeds uncertainty arising from curtailed operation).

EXAMPLE 13

Comparative Example to Example 11

The reactor of Example 1 is fitted with double propulsion chambers, fast cycle (0.2 hertz) fed with compressed air at 11 bar to feed granular solids to the pressurised reactor.

The dry 1:1 mixture of screened coal and olive waste from Example 11 is fed to the propulsion chambers in small quantities, pressurised and injected discontinuously.

The feed rate of the mixture is held constant at approximately 800 kg/hour over the 8 hours of the sequence. The 90% oxygen is premixed with recycled cold fumes, and fed to the reactor in a proportion such as to maintain the excess of oxygen in the flue gases produced at between 4 and 8%. The reactor gas loop is pressurized at a pressure of 400 kPa absolute. The recycled fumes are adjusted so as to reproduce the reactor fumes temperature slope of the experimental runs (+80 K/hour).

Abrupt and wide fluctuations in temperature (+/−150 K) are apparent from the readings of the laser diode at a frequency corresponding to the solid fuel injection cycle. The compositions figures are also affected by long cyclic fluctuations wider than the statistical scatter recorded in the sequences of Example 11. However, calculated means give the following emission trends:

|    | T flue gases | NO ppm | CO ppm | TOC ppm |
|----|--------------|--------|--------|---------|
| at | 1900 K       | 600    | 35     | 6       |
|    | 2100         | 750    | 40     | 2       | despite the relatively large fuel particles fed to the reactor.

The same ⅛ factor must be applied to the above figures in order to take account of the different volumes of flue gases per unit of fuel. Characterisation of the vitrified slag reveals no significant differences relative to Example 11.

Naturally, the principle of the invention remaining the same, the forms of embodiment and details of construction may be varied widely with respect to those described and illustrated, without thereby departing from the scope of the invention.

The invention claimed is:

1. A process for combusting with an oxidant, solid, liquid or gaseous fuels in a high temperature refractory-lined reactor with the aim of generating electric power, comprising feeding separately to the reactor two streams, each of said streams obtained, respectively:
    by mixing at least one fuel in a desired physical state, gas, vaporizable liquid, non-vaporizable liquid, and solid, with steam or water
    by mixing the oxidant with water, steam and/or recycled fumes;
    the reactor being isothermal, the temperature being from above 1300 K to below 2500 K, and the combustion process in the reactor being a flameless combustion process and being a single stage combustion process,
    wherein incombustible ash being completely transformed into molten ashes, separated in the combustor, and amounts of TOC not higher than 9 ppm, amounts of CO not higher than 60 ppm, and amounts of NOx not higher than 230 ppm, are produced,
    wherein the reactor consists of a single stage combustion chamber, ducts for the immission of the oxidant and the fuel, ducts for flue gases and a duct at the bottom of the reactor for the discharge of the molten ashes,
    wherein the oxidant is oxygen with a content of greater than 80% by volume, the remainder being an inert gas,
    wherein the concentration of water in the total feeds is not below 30% by weight, and
    wherein the reactor is operated under pressure.

2. A combustion process according to claim 1, characterised in that the fuel is a gaseous fuel selected from the group comprising hydrogen, methane, light hydrocarbons, syngas and other gaseous fuels with low calorific value, and in which the reactor is operated at a pressure of between 1500 kPa and 2500 kPa, the reactor being incorporated into a thermodynamic cycle for the generation of power.

3. A combustion process according to claim 2, characterised in that the fuel is solid, optionally a low ranking fuel, and in which the reactor is operated at a pressure of between 100 kPa and 2500 kPa, the reactor being incorporated into a thermodynamic cycle for the generation of power.

4. A combustion process according to claim 3, characterised in that the grain size of the solid is from 60 microns to 5 mm.

5. A combustion process according to claim 4, characterised in that the grain size of the solid is from 1 mm to 5 mm.

6. A process according to claim 1, characterised in that the oxidant is oxygen with a content of greater than 80% by volume, the remainder being an inert gas.

7. A combustion process according to claim 1, characterised in that the fuel is a vaporizable or non-vaporizable liquid, optionally a low ranking fuel, fed to the reactor without atomising nozzles, and in which the reactor is operated at a pressure of between 350 kPa and 2500 kPa, the reactor being incorporated into a thermodynamic cycle for the generation of power.

8. A process according to claim 7, characterised in that the oxidant is oxygen with a content of greater than 90% by volume, the remainder being an inert gas.

9. A high efficiency combustion reactor comprising an internal refractory lining for the performance of the combustion process according to claim 1, characterised in that it comprises axial inlets and peripheral outlets on the same side, wherein the fuel mixed with steam or water is fed to the axis of the reactor and the oxidant mixed with water, steam and/or recycled fumes is fed at a plurality of peripheral points around the fuel feeding.

10. A combustion process according to claim 1, wherein the combustion chamber includes axial inlets and peripheral outlets.

11. A process for combusting with an oxidant, solid, liquid or gaseous fuel in a high temperature refractory-lined reactor, said reactor having axial inlets and peripheral outlets, with the aim of generating power, comprising premixing at least one fuel with steam or water, premixing the oxidant with steam, and feeding the premixed fuel and the premixed oxidant to the reactor separately in two streams, the refractory material of the reactor and $H_2O$ and $CO_2$ of the reaction environment bringing about high power infrared radiation which substantially instantaneously preheats the reactants on input, said reactants being transparent to infrared radiation ($N_2/O_2$) but rendered opaque and thus absorbers of energy from infrared radiation by dilution with steam, the reactor being isothermal, the temperature being comprised from above 1300 K to below 2500 K, the combustion process in the reactor being a flameless combustion process and being a single stage combustion process, wherein incombustible ash being completely transformed into molten ashes, separated in the combustor, and amounts of TOC not higher than 9 ppm, amounts of CO not higher than 60 ppm, and amounts of NOx not higher than 230 ppm, are produced, wherein the reactor consists of a single stage combustion chamber, ducts for the immission of the oxidant and the fuel, ducts for flue gases and a duct at the bottom of the reactor for the discharge of the molten ashes, wherein the concentration of water in the total feeds is not below 30% by weight, wherein the reactor is operated under pressure, and wherein the oxidant is oxygen with a content of greater than 80% by volume, the remainder being an inert gas.

12. A combustion process according to claim 11, characterised in that the stream of fuel premixed with steam or water is fed to the axis of the reactor, the stream of oxidant premixed with steam being fed in a plurality of zones around the fuel feeding mixed fuel and peripheral outlets are placed on the same side.

13. A combustion process according to claim 11, characterised in that the fuel is a gaseous fuel selected from the group comprising hydrogen, methane, light hydrocarbons, syngas and other gaseous fuels with low calorific value, said gaseous fuel being mixed with steam.

14. A combustion process according to claim 11, characterised in that the fuel is a liquid fuel selected from the group comprising liquid hydrocarbons, heavy refinery fractions, bitumens, spent solvents, orimulsion, liquid fuels having a variable content of solid breakdown products, water and sulfur, said liquid fuel being mixed with water.

15. A combustion process according to claim 11, characterised in that the fuel is a solid fuel selected from the group comprising pit coal, high-sulfur coal, lignite, animal flours, refuse in granular form, said fuel being ground to obtain an approximate grain size around of less than 1 mm and being carried into the reactor by mean of an aqueous carrier.

* * * * *